United States Patent [19]

Ferguson

[11] Patent Number: 4,565,701
[45] Date of Patent: Jan. 21, 1986

[54] PROTEIN SUPPLEMENT TABLET USED IN DIET PROGRAMS

[75] Inventor: Roger Ferguson, Rexburg, Id.

[73] Assignee: Diet Center, Inc., Rexburg, Id.

[21] Appl. No.: 334,723

[22] Filed: Dec. 28, 1981

[51] Int. Cl.$^4$ ............................................. A23L 1/302
[52] U.S. Cl. ..................................... 426/72; 426/311; 426/656; 426/454; 426/810
[58] Field of Search .................. 426/62, 72, 311, 656, 426/454, 648, 810

[56] References Cited

U.S. PATENT DOCUMENTS

| | | | |
|---|---|---|---|
| 2,512,537 | 6/1950 | Zellers | 426/62 |
| 3,051,576 | 8/1962 | Lendvai | 426/62 |
| 3,079,303 | 2/1963 | Raff et al. | 426/454 X |
| 3,097,947 | 7/1963 | Kemmerer | 426/72 |
| 3,244,528 | 4/1966 | Torr | 426/658 X |
| 3,607,310 | 9/1971 | Carter, Jr. | 426/311 |
| 3,780,185 | 12/1973 | Fields | 426/72 |
| 3,879,567 | 4/1975 | Verner | 426/311 |
| 4,220,666 | 9/1980 | Fields | 426/62 |

FOREIGN PATENT DOCUMENTS 563151  9/1958  Canada ............................. 426/311

*Primary Examiner*—Robert Yoncoskie
*Attorney, Agent, or Firm*—Warren F. B. Lindsley

[57] ABSTRACT

A tasty dietary nutritional composition useful in the administration of diets of predetermined caloric intake adapted to weight control regimens and method of making wherein the composition comprises three pre mixed components. The first component comprises a blend of flavors mixed with a suitable vehicle. The second component comprises a blend of d-calcium pantothenate and B-Vitamins. The third component comprises an invert sugar, protein isolate, yeast and a binder.

2 Claims, 1 Drawing Figure

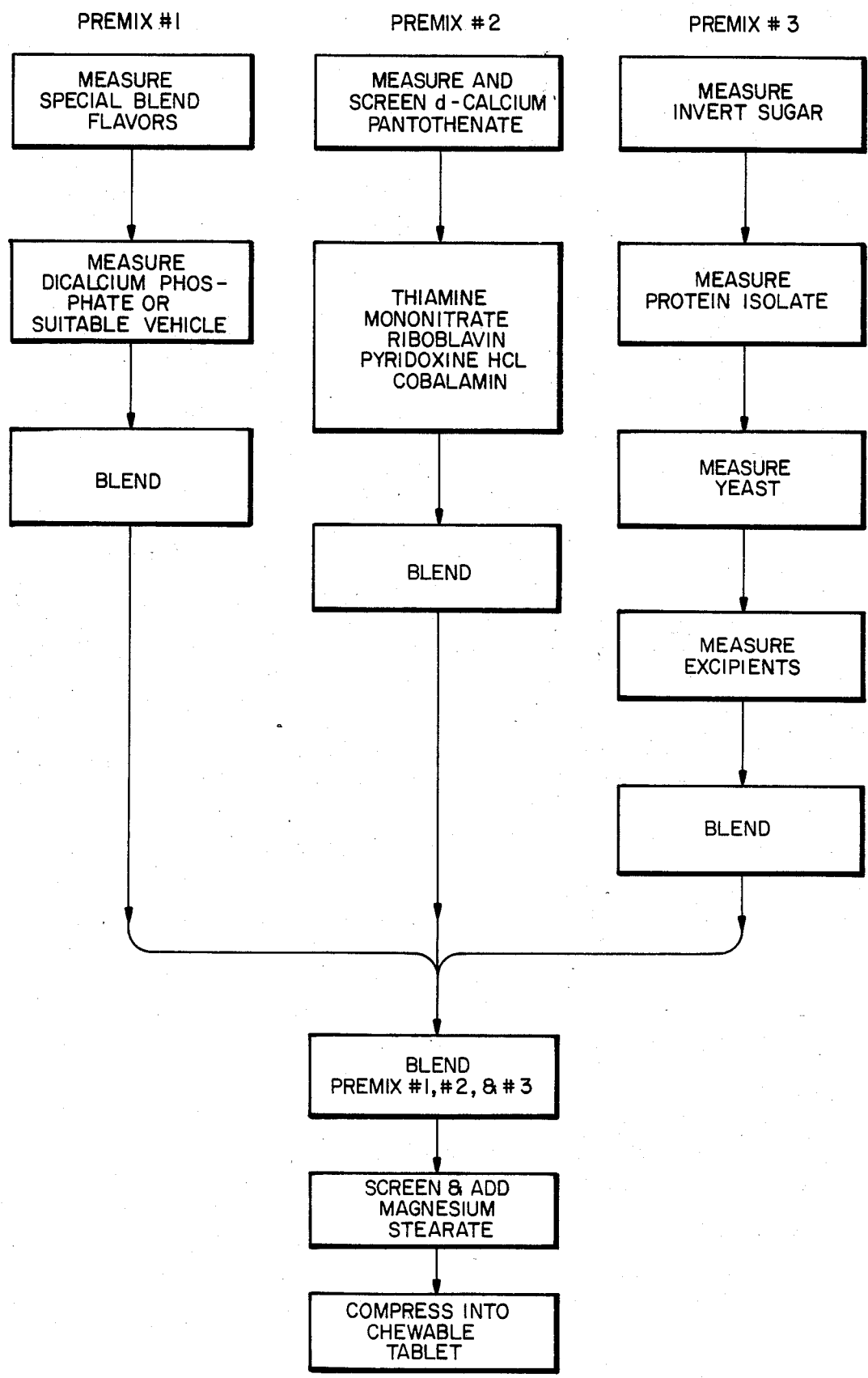

PROTEIN SUPPLEMENT TABLET USED IN DIET PROGRAMS

BACKGROUND OF THE INVENTION

This invention relates to improvements in nutritional compositions and more particularly to dietary nutritional compositions useful in the administration of diets of predetermined caloric intake adapted to weight control regimens. It further relates to a novel process for the preparation of a preferred form of a dietary composition.

Numerous attempts have been made to provide a dietary nutritional product which would be useful in the control of weight and yet provide for all known nutritional requirements and maintain satiety. Many of these known compositions, however, have undesirable taste and odor characteristics, especially if the composition is in a tablet chewable form. Frequently, the consumer who should include yeast in his diet as a nutritional component or as a source of vitamin B will object to the characteristic odor and flavor of the product in which yeast is included and becomes either unwilling or physically incapable of ingesting the same.

While the prior art products are able to overcome to a limited degree the undesirable taste of chewable dietary supplemental tablets, the consumer still objects and further improvements in the odor and taste of nutritional preparations are needed to improve consumer acceptance.

DESCRIPTION OF THE PRIOR ART

Although many attempts have been made to provide a dietary nutritional tablet or wafer for weight reducing purposes of high satiety value, none have fully satisfied the consumer with regard to odor and flavor, particularly in the chewable tablets.

U.S. Pat. No. 3,244,528 discloses a method of preparing a dry, powdered, unadulterated honey-milk composition of non-hygroscopic character.

U.S. Pat. No. 3,097,947 discloses a dietary nutritional composition and process for making it which product is intended to supply a ready source of energy. The product supplies adequate protein, carbohydrates and fat adequate to maintain health while on a reduced caloric intake.

U.S. Pat. No. 3,780,185 discloses a non-sticky product embodying honey prepared by admixing, blending and screening soy protein isolate, non-fat dried milk, sugar and dried honey. Sorbitol and natural honey are then added and the resultant mixture is blended, screened and tumble mixed before forming into tablets or wafers.

U.S. Pat. No. 3,879,567 discloses a method of preparing a dried honey composition of matter by admixing and blending a honey containing product comprising a dried composition of honey and a gelatinized starch material with distilled water and isopropyl alcohol which is then screened and mixed with magnesium stearate and formed into non-sticky tablets and wafers.

U.S. Pat. No. 3,607,310 discloses a method for producing fortified beet cane or corn sugar identical in appearance to unfortified sugar product by mixing a combination of coated nutrients, unfortified sugar and a masking agent, the mixing accompanied by a minimum of breaking of the nutrient coating.

U.S. Pat. No. 3,051,576 discloses a nutritional composition employing an autolyzed yeast ingredient and a method of attempting to control the odor and taste thereof.

U.S. Pat. No. 2,512,537 discloses a means for rendering vitamins, minerals, medicine, protein and other nutrients palatable by using suitable binders, such as molasses and flavoring, to coat them.

U.S. Pat. No. 4,220,666 discloses a particular nutrition composition as a dietary supplement for obese and/or diabetic persons.

SUMMARY OF THE INVENTION

In accordance with the invention claimed, an improved palatable dietary nutritional supplement is provided which is useful in weight control of humans and is pleasant and appealing in taste.

It is, therefore, one object of this invention to provide a new and improved chewable nutritious wafer for use as a diet supplement.

Another object of this invention is to provide a new and improved wafer or tablet for dietary use that is palatable to humans.

A further object of this invention is to provide a new and improved dietary nutritional composition that can be economically produced on a commercial basis.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which the FIGURE shown is a flow diagram for the manufacture of a dried dietary nutritional composition in chewable tablet or wafer form and embodying the invention.

DESCRIPTION OF THE PREFERRED EMBODIMENT

Referring more particularly to the drawing by characters of reference, the FIGURE shown discloses a flow diagram illustrating the method or process of making a new chewable composition of matter, such as tablets or wafers, which are flavored to satisfy the tastes of the consumer. The method or process disclosed mixes the ingredients in a new way such that the raw materials when mixed have a coherency which effects taste and facilitates packaging and handling.

In practicing the invention, the mixtures recommended for 250,000 wafers or tablets are formed in three parts called PRE MIX No. 1, PRE MIX No. 2 and PRE MIX No. 3 on the drawing. The raw materials of each of these three pre mix compositions are measured and weighed before being blended together, to form the tablets or wafers desired.

PRE MIX No. 1 comprises a mixture by weight of 1 to 2 percent of special blend flavors, such as a mixture of one or more of the group comprising apple cider, butterscotch, cinnamon, cloves, strawberry and vanilla, which are mixed for a predetermined time, such as five minutes, with approximately 23 gallons of a suitable vehicle, such as dicalcium phosphate, thereby forming a first part of the claimed composition.

PRE MIX No. 2 comprises a mixture by weight of 1.125 kilograms of a pantothenate acid, such as d-calcium pantothenate, which is screened and mixed with a suitable mixture of B-vitamins, which may comprise 1.200 kilograms of Vitamin $B_1$, such as Rocoat Thiamine Mononitrate; 1.650 kilograms of Vitamin $B_2$, which may comprise Rocoat Riboflavin; 0.750 kilograms of Vitamin $B_6$, which may comprise Rocoat Pyridoxine HCL; and 0.103 kilograms of Vitamin $B_{12}$, which may comprise Cobalamin. This combination is mixed, blended and screened through 12-14 mesh screen for approximately three minutes to form a second part of the composition.

PRE MIX No. 3 comprises a mixture and blending by weight of a suitable invert sugar which may comprise 65.900 kilograms of corn sugar dextrose mixed and blended with 65.900 kilograms of a suitable fructose, i.e., a sugar called levulose found in sweet fruit, honey and the like; 110.140 kilograms of a soy protein isolate which may be a sodium proteinate of unusually high water dispersibility and flavor compatibility such as Kraft, Inc.'s Isolated Soy Protein; and 4.500 kilograms of a suitable dried yeast of the type 10-12-1, such as that sold by Lake States and known as their Torula Dried Yeast. This mixture is then mixed with other palatable materials which may be used as binders and film coating for the tablets, such as 12.000 kilograms of a hydroxypropyl cellulose sold by Hercules Corporation under the registered trademark KLUCEL. After a suitable blending action, such as for example, five minutes, the third PRE MIX of the composition is ready for mixing with PRE MIX No. 1 and PRE MIX No. 2.

PRE MIX Nos. 1, 2 and 3 are then blended together in a blender together with 1.350 kilograms of magnesium stearate for thirty minutes and screened through a 20 mesh screen. This mixture is then transmitted to a tablet forming machine where it is formed into tablets, wafers or the like and packaged for use and sale.

Although but a single embodiment of the present invention has been illustrated and described, it will be apparent to those skilled in the art that various changes and modifications may be made therein without departing from the spirit of the invention or from the scope of the appended claims.

What is claimed is:

1. A method of preparing a diet supplement comprising:

mixing first ingredients comprising a blend of flavors with dicalcium phosphate, blending said first ingredients, mixing second ingredients comprising approximately 1.125 kilograms of d-calcium pantothenate, approximately 1.200 kilograms of thiamine mononitrate, approximately 1.650 kilograms of riboflavin, approximately 0.750 kilograms of pyridoxine and approximately 0.103 kilograms of cobalamin, blending said second ingredients until they pass through a 12 to 14 mesh screen, mixing third ingredients comprising approximately 131.800 kilograms of an invert sugar, approximately 110.140 kilograms of a protein isolate, approximately 4.500 kilograms of yeast and approximately 12.000 kilograms of hydroxypropyl cellulose, blending said third ingredients until they pass through a 12 to 14 mesh screen, and blending said first, second and third ingredients, mixing approximately 1.350 kilograms of magnesium stearate with the mixture of said first, second and third ingredients until said latter mixture passes through a 12 to 14 mesh screen, and forming said last mixture into tablet or wafer form.

2. A tablet prepared in accordance with the method of claim 1.

* * * * *